United States Patent
Clark et al.

(10) Patent No.: US 7,460,148 B1
(45) Date of Patent: Dec. 2, 2008

(54) NEAR REAL-TIME DISSEMINATION OF SURVEILLANCE VIDEO

(75) Inventors: J. Edwin Clark, Tampa, FL (US); Glenn J. Horton, Leesburg, VA (US); Vincent Castello, Great Falls, VA (US); Daniel W. Wells, Burke, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 931 days.

(21) Appl. No.: 10/779,814

(22) Filed: Feb. 18, 2004

Related U.S. Application Data (60) Provisional application No. 60/447,744, filed on Feb. 19, 2003.

(51) Int. Cl.
  *H04N 7/18* (2006.01)
  *H04Q 7/00* (2006.01)
(52) U.S. Cl. .................... 348/143; 340/539.13
(58) Field of Classification Search .............. 348/142, 348/143, 333.02, 169, 170; 340/539.13, 340/541; 725/105
See application file for complete search history.

(56) References Cited

U.S. PATENT DOCUMENTS

| | | | | |
|---|---|---|---|---|
| 6,271,752 B1 * | 8/2001 | Vaios | ........................ | 340/541 |
| 6,608,559 B1 * | 8/2003 | Lemelson et al. | ...... | 340/539.13 |
| 7,050,102 B1 * | 5/2006 | Vincent | ................. | 348/333.02 |
| 7,199,817 B2 * | 4/2007 | Mottur et al. | ............... | 348/142 |
| 2007/0022456 A1 * | 1/2007 | Esbensen | ................... | 725/105 |

* cited by examiner

*Primary Examiner*—Gims S Philippe

(57) ABSTRACT

The disclosed Near Real-Time Video (NRTV) system is a complete video processing, smart dissemination and user display capability for dissemination of video data from surveillance systems, such as manned and unmanned aerial surveillance platforms. The system requires significantly less bandwidth for dissemination than traditional, full analog video distribution. The exemplary system ingests an analog video source signal from a surveillance platform, digitizes the video, and allows a local or remote user to visualize frames of the video field of view on a standard map display. From an overlay of the field(s) of view, the system allows the user to request selected images or a video clip from the actual video surveillance information. Using available communications, the request is relayed to the video processing subsystem, and a video file of the requested information is generated and sent back to the user for display, all in near real-time.

32 Claims, 8 Drawing Sheets

Fig. 5 Notification: Video Availability Notice (VAN)

Fig. 6 Reachback: Tactical Information Request (TIR)

Fig. 7 Dissemination: Delivery of Video Clip or Individual Frame

Fig. 8 Screen display of Video Availability Notifications overlayed on a map background

Fig. 9 Screen display showing video clip process initiation

Fig. 10 Screen display of user selection of video clip start and end time

Fig. 11  Screen display showing result of video clip request

Fig. 12 UAV Camera Field of View Calculation

NEAR REAL-TIME DISSEMINATION OF SURVEILLANCE VIDEO

RELATED APPLICATIONS

This application claims the benefit of U.S. Provisional Application No. 60/447,744 filed Feb. 19, 2003 entitled "Near Real-Time Dissemination of Surveillance Video," the disclosure of which is entirely incorporated herein by reference.

TECHNICAL FIELD

The present subject matter relates to systems, techniques and software for the smart dissemination of video surveillance information in near real-time, for example, to tactical users in the field via limited bandwidth communication facilities.

BACKGROUND

Demand for bandwidth has continued to grow as the military has developed more data-intensive weapons and intelligence surveillance and reconnaissance systems. However, scarcity/limitations on both military and commercial communication links and additional bandwidth required to transmit streaming video from an unmanned aerial vehicle (UAV) or satellite sources has limited dissemination of such information, especially to the lowest echelon forces. As the availability of strategic surveillance video expands, the need to effectively distribute such information to the forces needing to use it will grow exponentially. It is unlikely that the bandwidth to transport such information can keep pace.

Presently, only one channel of UAV video requires bandwidth in the megabit per second range. Couple this with the enormous bandwidth consumed by the GLOBAL HAWK drone, and demand for bandwidth stands as a major barrier to beaming this timely intelligence information to US ground, air, and naval units for planning and direct military support purposes. In addition, the viewing of current analog collection video is time consuming and labor intensive, especially in retrieving past information, which can require lengthy serial searches of data tapes. Furthermore, the conventional method of viewing the earth through a narrow field of view sensor (equivalent to looking out an airplane window with a soda straw) does not provide a geographic context (e.g., "Where am I?", and "What's ahead?").

Similar problems arise in other operations that could take advantage of timely distribution of video information to personnel in the filed, such as distribution of surveillance video to police and homeland security operatives.

A need exists for an enhanced technique for providing solutions to these problems. Specifically, there is a need to provide wide dissemination of tactically useful portions of surveillance video to the particular users in the field who need relevant portions of the video information. Any such solution should provide near real-time distribution of the information yet require minimal bandwidth on the links to the end users. The distribution system should offer intelligence to military forces or other users operating round-the-clock, anywhere on the globe. Also, the solution should be readily adaptable to virtually any user terminal equipment and/or user communication capability available in the field.

SUMMARY

The inventive concepts alleviate one or more of the above noted issues or needs regarding dissemination of video intelligence information for UAV sources and other video surveillance platforms. The disclosed near real-time video (NRTV) system provides a unique solution to the problems outlined above and addresses other issues relating to practical dissemination of tactical video information to users in the field of operations. The disclosed system encapsulates a smart pull paradigm, intuitive graphics-driven notification, and a unique reach back mechanism capable of delivering time-sensitive surveillance video clips and/or still images, at a fraction of the bandwidth required by traditional streaming video, for example, to military forces operating round-the-clock, anywhere on the globe.

Methodologies for the distribution of video surveillance information are implemented on a server and/or on a terminal device. For example, a server method for disseminating video surveillance information might entail receiving and storing real-time video image information from a camera mounted on a moveable surveillance platform, over a period of time. With the video image information, the server also receives position and orientation telemetry regarding operation of the camera. The server forwards information regarding the telemetry, in notification messages sent to a user's client device. When the server receives an information request from the user's client device, which identifies a user selected portion of the received video image information, the server transmits the selected video image information to the user's client device, for example, for display as a short video clip or for display of selected frames.

As another example, a terminal or client device oriented method, for obtaining and presenting video surveillance information, involves receiving position and orientation telemetry regarding operation of a camera mounted on a moveable surveillance platform, over a period of time. The terminal processes the telemetry, to determine a view of the camera over the period of time; and it displays the determined view of the camera over time, on a user interface. The terminal detects a user selection of a view via the user interface. The selected view corresponds to a portion of the period of time. In response, the terminal formulates an information request indicating the corresponding portion of the time period and sends that request to a facility having access to stored video information received from the camera. The terminal receives one or more frames of video information generated by the camera, from the facility. The one or more frames contain actual image data taken by the camera during the corresponding portion of the period of time and thus correspond to the user selected view; and the terminal displays the received video information to the user.

As disclosed, a typical NRTV system consists of a server component and a client component. The server component consists of a set of processing equipment and software that can be rack mounted or mounted in a movable transit case. The server component interfaces to one or more user communications components, depending upon user requirements. The client component also interfaces to one or more user communications components and consists of a processing system (typically a PC—desktop or laptop) and an information management/display software package.

The server component provides the capability to input unencrypted video in any analog or digital video format (NTSC, PAL, MPEG, etc.) from manned or unmanned video surveillance systems, such as the Predator UAV, digitize (encode and timestamp), capture frames at specified intervals (or based upon various trigger events), encode and time stamp the frames, and store all data locally for an entire collection mission (up to about 8 hours). In near real time it also can process (parse, error correct, and store locally as an ASCII file) metadata about the sensor collection parametrics (telemetry) that are generated at prescribed intervals and distributed in the data stream from the sensor, in parallel with the video processing. This functionality is made possible through the integration of commercially available hardware and software. The server additionally provides the ability to manage the transmission of data files between the server and the client in a synchronous or asynchronous manner to accommodate a range of network or radio communication interfaces to/from a user. The video processor software also provides the capability to add literal annotations to a video frame. The annotations are then included in the video availability notice (VAN) message and passed to the user by the communications processor. The annotations are then displayed by the client software to provide the user with content information about the video.

The client component can receive and process the sensor collection metadata and generate and display graphic overlays that represent the outline of the video frames and thus the field of view of the video camera for each of the frames. The client displays these frame outline overlays together with content annotations, if any, that were captured by the server component at prescribed intervals as well as the location of the collection platform, all in near real time relative to the actual collection of the video data by the collection platform. The communications with the client device use available user communications resources. The client device provides mapping software that allows the overlays to be displayed over digital map data, to provide full geographic context to the sensor collection field of view. Thus the user is allowed to visually become aware of the remote sensor collection in near real time. The client component also allows the user to graphically request a video clip from what has been collected up to the point in time selected for the on-going mission and handle the transmission of that request to the server component over user available communications. The client also can display the resulting video clip to the user, when it arrives over the user communications system.

Aspects of the NRTV concept relate to systems and computer components, such as the server and the client device, programmed to implement the unique functions of the NRTV system outlined above. Other concepts relate to unique software for implementing the server and client functions on programmable computer devices. A software product, in accord with this concept, includes information that may be carried by at least one machine-readable medium and information. The information carried by the medium may be executable code, one or more databases and/or information regarding surveillance video available through the NRTV dissemination technology.

A computer or machine "readable storage medium," as used herein, may be any physical element, which can store instructions or code for performing a sequence of steps in a machine-readable form or associated data. Examples of physical forms of such media include floppy disks, flexible disks, hard disks, magnetic tape, any other magnetic storage medium, a CD-ROM, any other optical medium, a RAM, a ROM, a PROM, an EPROM, a FLASH-EPROM, any other memory chip or cartridge, as well as media bearing the software in a scannable format.

Additional advantages and novel features of the examples will be set forth in part in the description which follows, and in part will become apparent to those skilled in the art upon examination of the following and the accompanying drawings or may be learned by production or operation of the examples. The advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The various examples disclosed herein relate to systems, techniques and software for near real-time dissemination of video data from surveillance systems, such as manned and unmanned aerial surveillance platforms. The exemplary system processes one video source signal from a surveillance platform. If the source signal is analog, the system digitizes the video. The system allows a local or remote user to visualize frames representing the video field of view at set times, on a standard map display of the area under surveillance. From an overlay of the field(s) of view, the system allows the user to reach back and request a video clip from the actual video surveillance information. Using available communications, the request is relayed to the video processing subsystem, and a video file of the video collected for the requested time period is generated and sent back to the user for display, all in near real-time. The communication of the request and downloading of the video clip, however, requires far less bandwidth than real-time streaming or analog transmission of the entire surveillance video.

Figure 1:
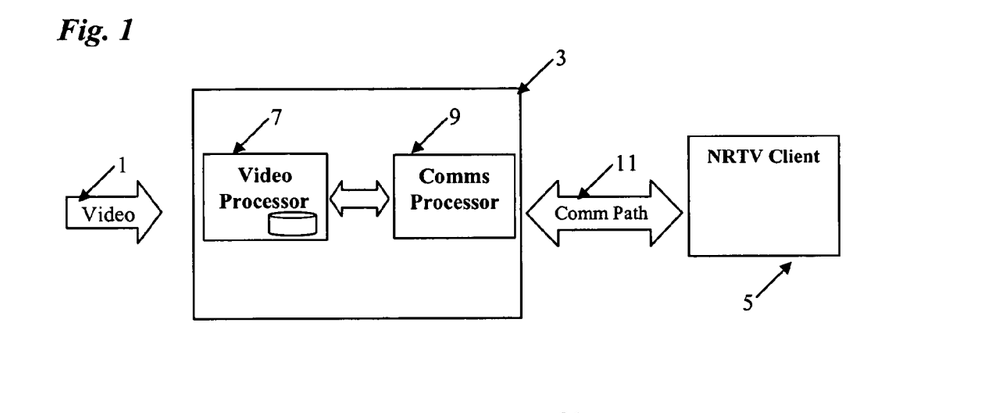
FIG. 1 a high-level functional block diagram of a video surveillance system with near real-time dissemination of portions of the video.

Reference now is made in detail to the examples illustrated in the accompanying drawings and discussed below. FIG. 1 provides a high-level view of the elements of a system that might implement the near real-time video dissemination. As shown, the system comprises a video data source 1, a server 3 and a client component 5. The server 3 includes a video processor system 7 and a communications processor 9. The video processor system 7 may be implemented in hardware and/or software of a general purpose computer functioning as the server 3. The communication processor provides physical and logical interfacing for communication with a number of client devices 5, via one or more available communication paths 11.

The system of FIG. 1 processes and disseminates video information obtained from one or more surveillance platforms. The system may work with video and telemetry from any appropriate platform. It is assumed that those skilled in the art are familiar with such platforms and the structure and operations of a wide variety of such platforms. However, to insure completeness and facilitate understanding by some readers, a brief summary discussion of exemplary video surveillance platforms follows.

Figure 2:
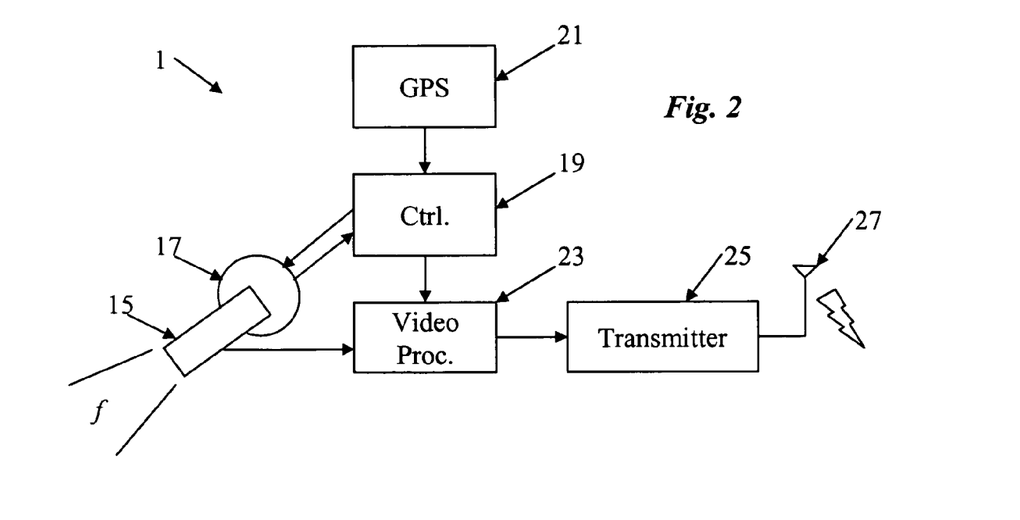
FIG. 2 is a simplified diagram of the video components on board a surveillance platform.

FIG. 2 provides a simplified block diagram of the video processing elements, as they might be used on an aerial video surveillance platform. The platform may be a satellite or a manned aircraft, commonly used for military, police, anti-terrorism, or other surveillance applications. The platform could be mounted on a land vehicle, or in some cases moveably mounted at a relatively fixed location. For purposes of further discussion, however, the example will be assumed to use an unmanned aerial vehicle (UAV).

As shown in FIG. 2, the video data source 1 includes a camera 15 manipulated by a robotic control mechanism 17, for example mounted on a UAV (not shown). The camera images objects within its field of view and generates a responsive video signal, in real time. The robotic control mechanism 17 controls the horizontal direction of the camera 15 relative to the flight path of the UAV as well as the elevation (up-down) angle of the camera 15. The robotic control mechanism 17 controls the field of view f of the camera 15. The robotic control mechanism 17 is operated by a controller 19 and may provide feedback signals to the controller 19. In this manner, the controller 19 maintains data regarding the directional orientation and elevation of the camera 15 relative to the UAV flight path, as well as data regarding the field of view f of the camera 15.

A global positioning system (GPS) processor 21 constantly receives and processes satellite signals to determine the three-dimensional coordinates of the UAV. The processor supplies the position data to the controller 19. The video signal may be an analog video signal (NTSC or PAL formats), typically from a UAV such as the Predator UAV. Alternatively, the video may be a digital signal, in which case the system will not have to digitize the video signal, but will process the digital video format. A video processor 23 receives the video signal from the camera 15, the GPS data regarding the position of the UAV and the data regarding camera orientation and field of view and multiplexes the various signals and data together for transmission. A transmitter 25 sends the combined signal from an antenna 27 on the UAV over a wireless link and an appropriate network (not separately shown) to the server 3.

Returning to FIG. 1, the video signal (which is assumed to be unencrypted at this point) is fed into the video processor sub-component 7, where the telemetry data is separated out, indexed and separately stored. If the source video signal is analog, the video processor sub-component 7 digitizes the video data. Those skilled in the art will recognize that the video components on the UAV may produce a digital video signal. The video processor sub-component 7 indexes and separately stores the digitized video signal, for future access.

The video processor sub-component 7 also generates a data file of the telemetry information that it passes on to the communications processor sub-component 9, for delivery to the clients 5. These data files serve as the basis for the Video Availability Notification messages, or VANs. Each VAN provides sufficient information to allow a client device to determine the corner points, in latitude and longitude, of the camera sensor field of view at a point in time, as projected onto a map of the area under surveillance. The camera sensor field of view in relation to the ground is calculated from the parsed values of target latitude and target longitude (which represent the center of the camera field of view), angular sensor field-of-view f, and sensor azimuth. First (See FIG. 12), the target latitude and longitude is used to define an initial Earth Centered Fixed (ECF) vector. Next, the sensor field-of-view and azimuth are used to define the angles between the field of view center point and each corner point. The ECF vector of the target location is rotated through each of the respective angles generated above to determine the latitude and longitude of each corner point.

Figure 12:
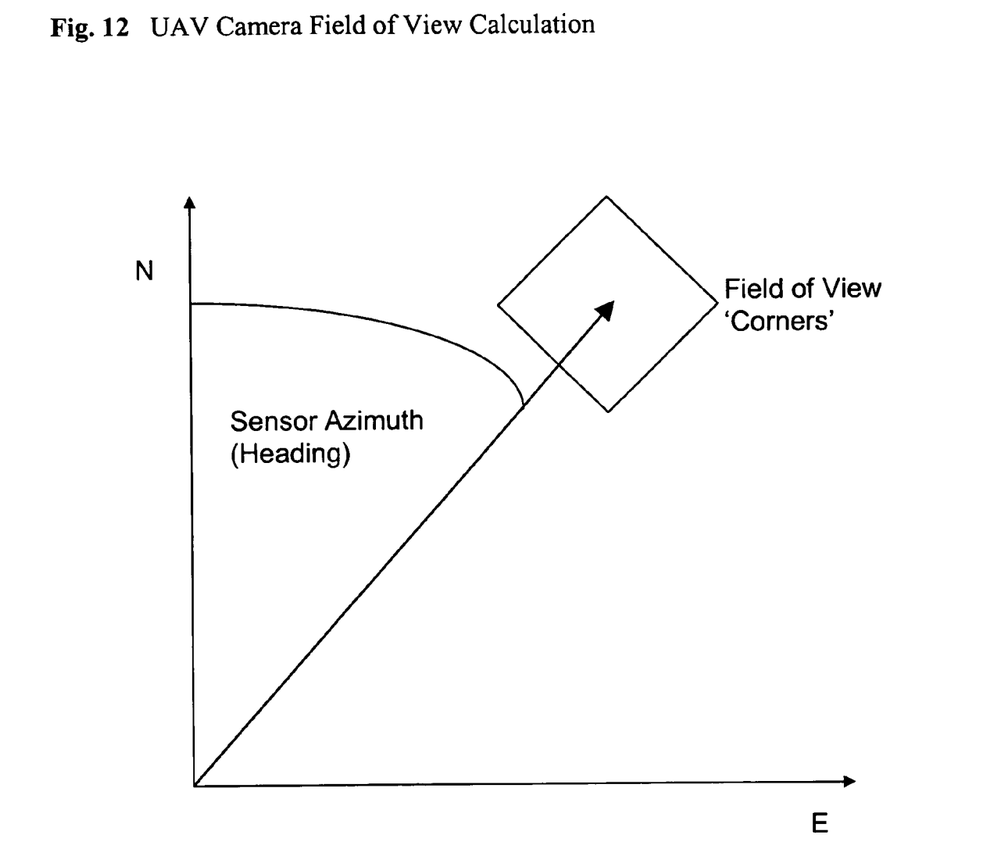
FIG. 12 illustrates the field of view geometry and is helpful in understanding the determination of the filed of view overylays.

An NRTV client polygon overlay is then created and the four geographic corner coordinates are stored in the overlay. One overlay is generated for each validated VAN. All the overlays for each generated frame are stored in a NRTV client UAV overlay. When the UAV overlay is painted onto a map background, the mapping software generates device point coordinates for each geographic coordinate stored in each of the NRTV polygons.

Figure 8:
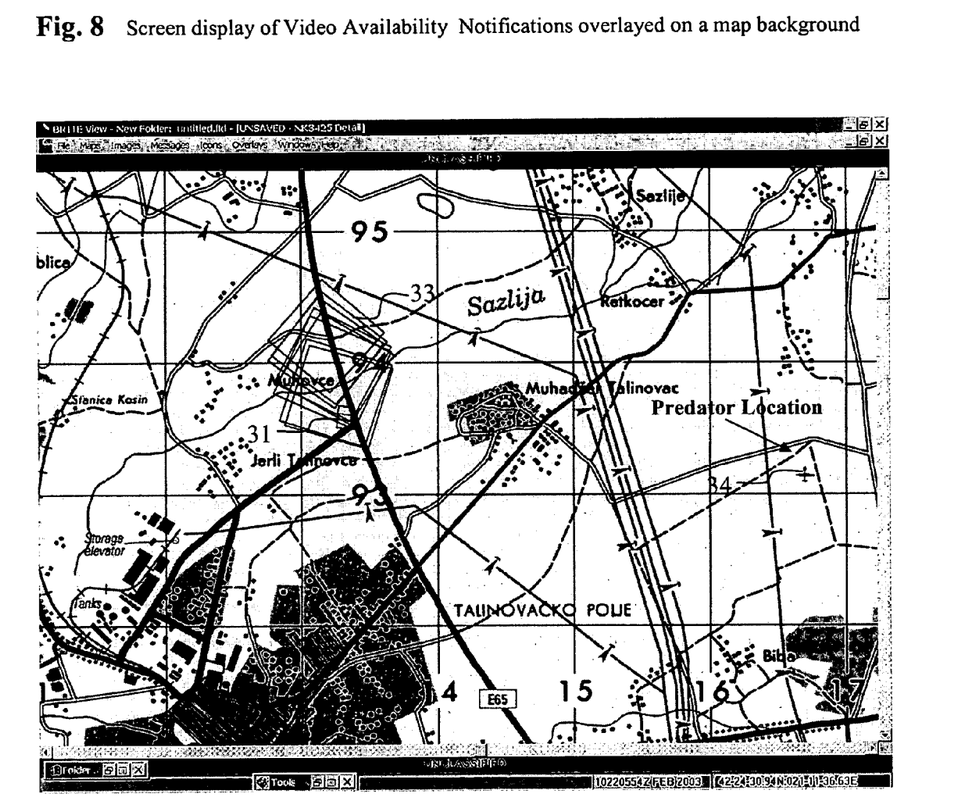
FIGS. 8 to 11, show screen shots of each stage in the process of notifying, requesting and receiving video related information, as presented by the client software application.

The server periodically generates a VAN in response to the telemetry data and sends the VAN to each client device that is monitoring the current UAV surveillance mission. The client 5 displays one or more of the VANs as rectangular or square geographic overlays on a map background, for example, as shown in FIG. 8. In this manner, frames from the incoming video are virtually sampled by the server at regular intervals (generating a VAN for one frame every 3-4 seconds), and each virtual frame is displayed on the client device as a field of view rectangle overlaid on the map. In FIG. 8, the current frame is represented as a rectangle 31, with the previous nine frames shown as rectangles 33. Although the data is available as stored in the client device, earlier frame overlays are not shown on the display unless the user selects to scroll back through the mission data. The map display may also show a projection of the current location of the UAV, for example, as an icon for an airplane 34, based on the latitude and longitude data in the most recent VAN message. In an example with a color display, the current frame rectangle 31 might be shown in red, whereas the rectangles 33 for the previous nine frames might appear in blue. As each new VAN is processed to display a new frame, the preceding frame will be changed from red to blue, with a total of ten frames always displayed. The UAV icon 34 may also appear in red.

Figure 9:
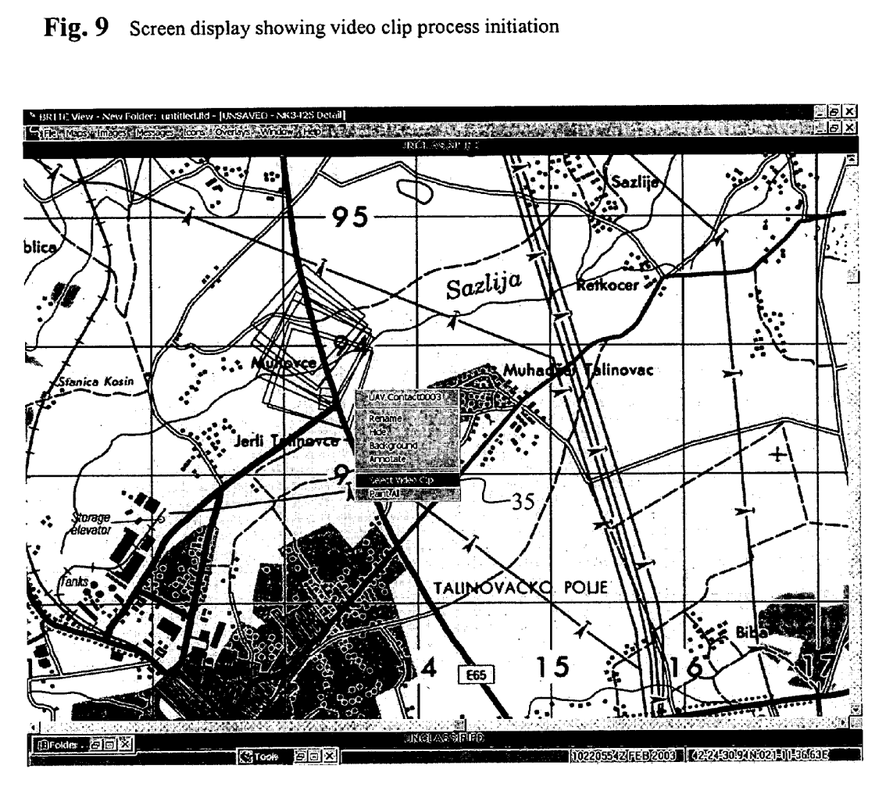

The user then has the option of requesting a video clip, or one or more still frames, from the video collection information. The user begins the process by selecting the UAV frame information (a left mouse click over one of the displayed frames) and then making a right mouse click. This will cause the client device to display the option to select a video clip, as shown at 35 in FIG. 9. After the user clicks on Select Video Clip, a new dialog box 37 (FIG. 10) will appear with a slider bar 39, to select the start and end times of the video clip.

Figure 10:
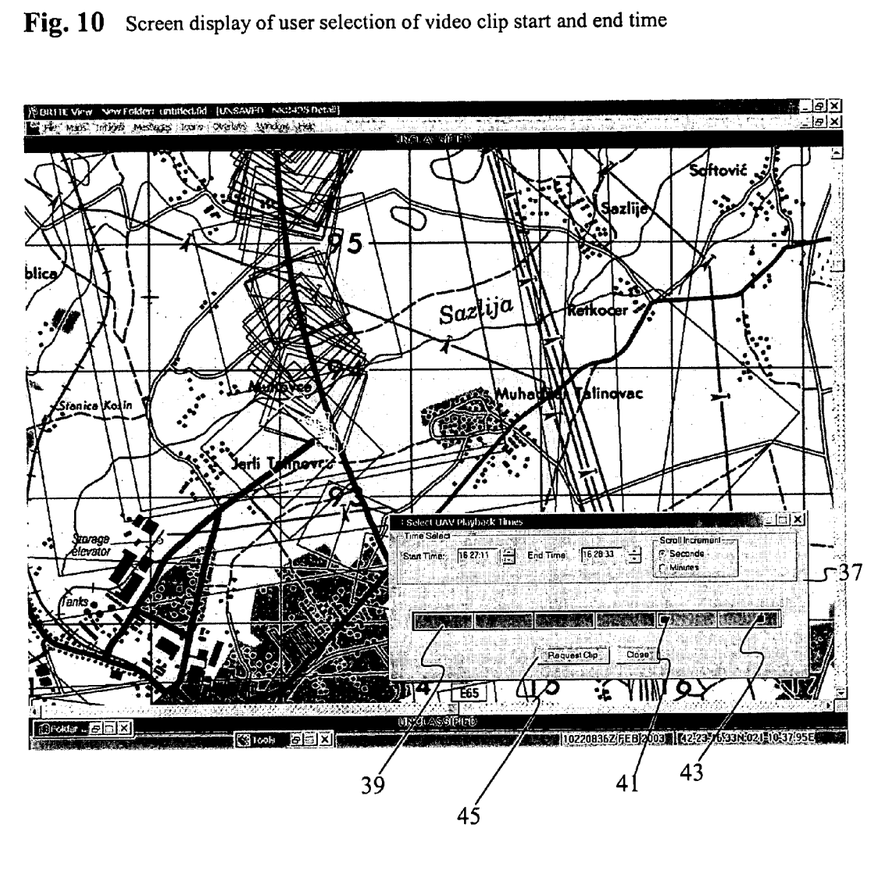

FIG. 10 shows the method by which a user would identify the start and end times of the desired video clip based upon the frame information, and then request that clip. The user begins the process by selecting (left mouse click and hold) the one of the slider bar handles 41, 43 (the small, solid black rectangles at the ends of a cyan colored part of the bar in the Select UAV Playback Times window). When the user slides the left handle 41 to the right, the Start Time window moves forward in time and the video frames corresponding to the start and end times are selected (change color), to indicate what camera field of view areas will be represented in the corresponding video clip. Selecting the right most slider bar handle 43 changes the end time in a similar manner. Other selection input techniques may be used.

Figure 11:
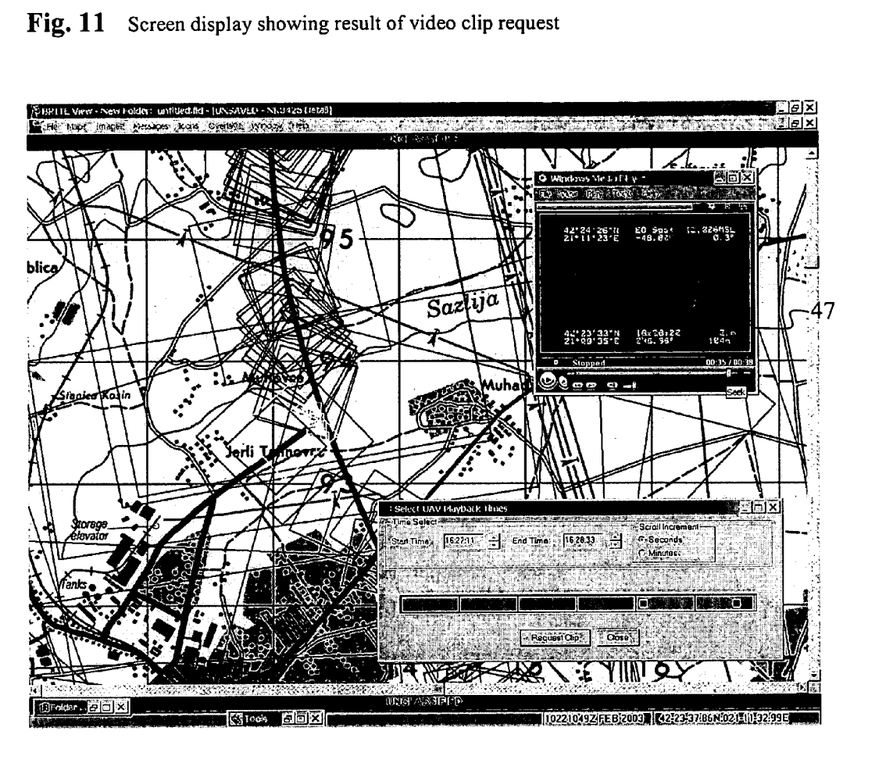

Once the user has adjusted the slider bar 39 to select the start and end times of the requested video clip, the start and end frames will be highlighted on the map (for example as yellow rectangles). The user can then select the Request Clip button 45. Once this is done the information is relayed back to the communications processor 9 in the server 3, and then sent on to the video processor 7 to extract the appropriate stills or video clip from the stored information. The server 3 compiles a file of the requested/extracted video, essentially forming one or more frames of a video clip, and sends the file back to the user client 5 that requested it, as shown in FIG. 11. The video clip is displayed, for example, in a separate window 47 using the Microsoft Media Player. The video can be started and stopped at any point in the clip. Annotations can also be added to any video frame using the video processing software.

The various client devices 5 and the server 3 shown in the drawings are fairly well known general purpose computers and/or mobile computing devices. It is assumed that those of skill in the relevant arts will be familiar with the structure, programming and operations of such devices. However, to insure adequacy of the teaching here to various readers, it may be helpful to briefly review the relevant technologies.

Figure 3:
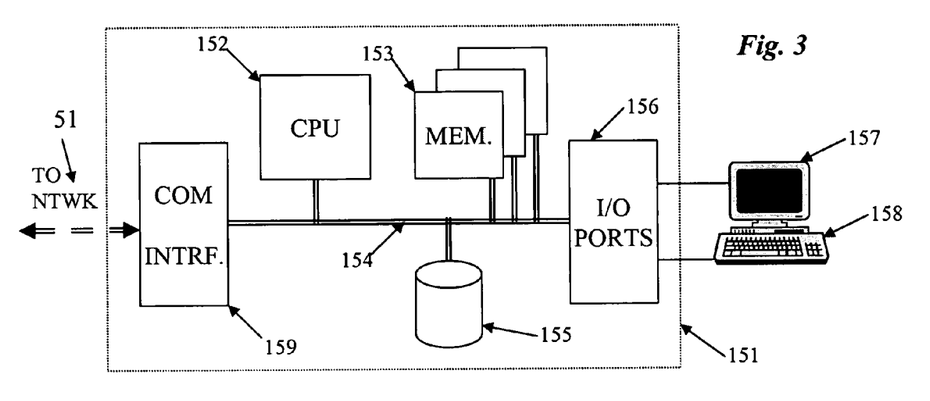
FIG. 3 is a simplified block diagram of a general purpose computer, which may serve as the client device in the system/network of FIG. 1.

FIG. 3 is a functional block diagram of a PC or workstation type implementation of a system 151, which may serve as one of the client devices 5, for accessing the video surveillance data. The exemplary computer system 151 contains a central processing unit (CPU) 152, memories 153 and an interconnect bus 154. The CPU 152 may contain a single microprocessor, or may contain a plurality of microprocessors for configuring the computer system 152 as a multi-processor system. The memories 153 include a main memory, a read only memory, and mass storage devices such as various disk drives, tape drives, etc. The main memory typically includes dynamic random access memory (DRAM) and high-speed cache memory. In operation, the main memory stores at least portions of data and of instructions for execution by the CPU 152.

The mass storage may include one or more magnetic disk or tape drives or optical disk drives, for storing data and instructions for use by CPU 152. For a laptop PC, for example, at least one mass storage system 155 in the form of a disk drive or tape drive, stores the operating system and application software as well as data, including received messages and documents, and for purposes of the video application, will store received camera telemetry information and received video surveillance data. The mass storage 155 within the computer system 151 may also include one or more drives for various portable media, such as a floppy disk, a compact disk read only memory (CD-ROM), or an integrated circuit non-volatile memory adapter (i.e. PCMCIA adapter), to input and output data and code to and from the computer system 151.

The computer system 151 includes appropriate input/output ports 156 for interconnection with a display 157 and a keyboard 158 serving as the respective user interface. For example, the computer may include a graphics subsystem to drive the output display 157. The output display 157 may include a cathode ray tube (CRT) display or liquid crystal display (LCD). Although not shown, the PC type system typically would include a port for connection to a printer. The input control devices for such an implementation of the system 151 would include the keyboard 158 for inputting alphanumeric and other key information. The input control devices for the system may further include a cursor control device (not shown), such as a touchpad, a mouse, a trackball, stylus, or cursor direction keys. The links of the peripherals 157, 158 to the system 151 may be wired connections or use wireless communications.

The system 151 also includes one or more input/output interfaces for communications, shown by way of example as an interface 159 for data communications via a network. The physical communication links may be optical, wired, or wireless (e.g., via satellite network, etc.). For some users, the interface 159 may provide landline-based communications, e.g. via data communication modem or local area network card or the like. However, for personnel at remote locations in the field, the interface 159 provides a wireless communication link. The communication link may be broadband, but in many instances, the bandwidth of the link is relatively limited.

Each computer system 151 runs an operating system as well as a variety of applications programs and stores data, enabling one or more interactions via the user interface, provided through elements such as 157 and 158, and/or over the network 51 to implement the desired processing for the video service application. The client computer 151, for example, runs a map program, a media player, etc. to implement the client programming for the NRTV video presentation functions described and shown herein.

Figure 4:
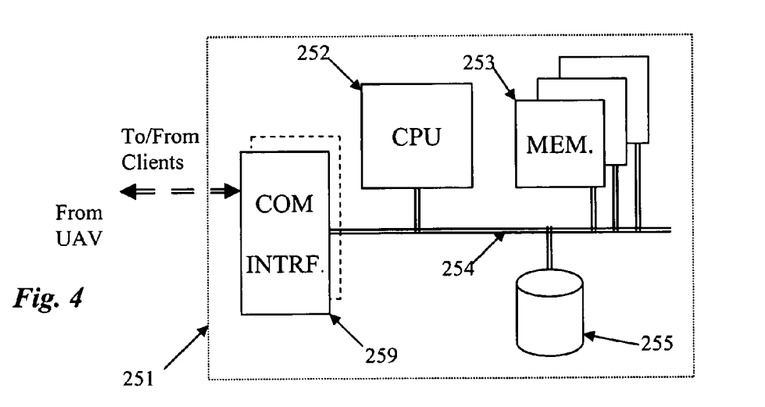
FIG. 4 is a simplified block diagram of a general purpose computer, which may operate as the server device in the system/network of FIG. 1.

FIG. 4 is a functional block diagram of a general purpose computer system 251, which may perform the functions of the server 3. The exemplary computer system 251 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of data and of instructions for execution by the CPU 252.

The mass storage may include one or more magnetic disk or tape drives or optical disk drives, for storing data and instructions for use by CPU 252. At least one mass storage system 255, preferably in the form of a disk drive or tape drive, stores the data and programming related to the video dissemination services. The mass storage 255 may also include one or more drives for various portable media, such as a floppy disk, a compact disk read only memory (CD-ROM), or an integrated circuit non-volatile memory adapter (i.e. PCMCIA adapter) to input and output data and code to and from the computer system 251.

The system 251 also includes one or more input/output interfaces for communications, shown by way of example as an interface 259 for data communications. The interface 259 may be a modem, an Ethernet card or any other appropriate data communications device. To perform as one of the servers 3, for the video dissemination to a large number of end user clients 5, the interface 259 preferably provides a relatively high-speed link to the network, although the final links to the individual clients 5 may use relatively narrow bandwidth technologies. The same or a separate communication interface also enables the server to receive telemetry and video data from one or more source systems 1 mounted on one or more UAVs or the like. If the video surveillance platform sends analog video, the server may have a separate receiver and video processing card to receive and digitize the video signal and parse the telemetry data.

Although not shown, the system 251 may further include appropriate input/output ports for interconnection with a local display and a keyboard or the like serving as a local user interface for programming purposes. Alternatively, the server operations personnel may interact with the system 251 for control and programming of the system from a device similar to the system shown in FIG. 3, which may be locally connected thereto or connected to the server 3 via the Internet or some other network link.

The computer system 251 runs a variety of applications programs and stores relevant data, such as the above noted programs for the near real-time video dissemination operations. For instance, in this example, the video processing function 7 is performed by the CPU 252 under software control. Those skilled in the art will recognize that all or portions of the video processing could be performed in hardware, for example, on a video processing card (not shown). Those skilled in the art will recognize that the computer system 251 may run other programs and/or host other applications. Also, each system 251 may be implemented as a single computer system or as a distributed system having multiple appearances at different nodes on a network.

The components contained in the computer systems 151 and 251 are those typically found in general purpose computer systems used as servers, workstations, personal computers, network terminals, and the like. In fact, these components are intended to represent a broad category of such computer components that are well known in the art.

Figure 5:
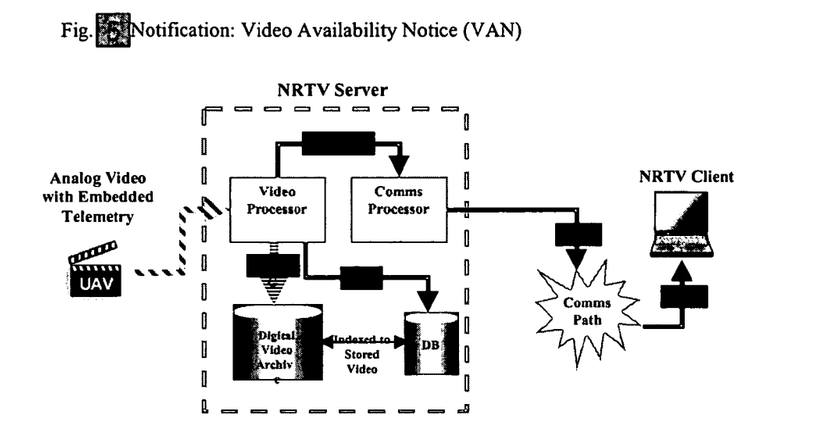
FIGS. 5 to 7 are a series of flow diagrams, useful in explaining the communications flow during various stages of operation of the system, including notification, reachback and dissemination.
Figure 6:
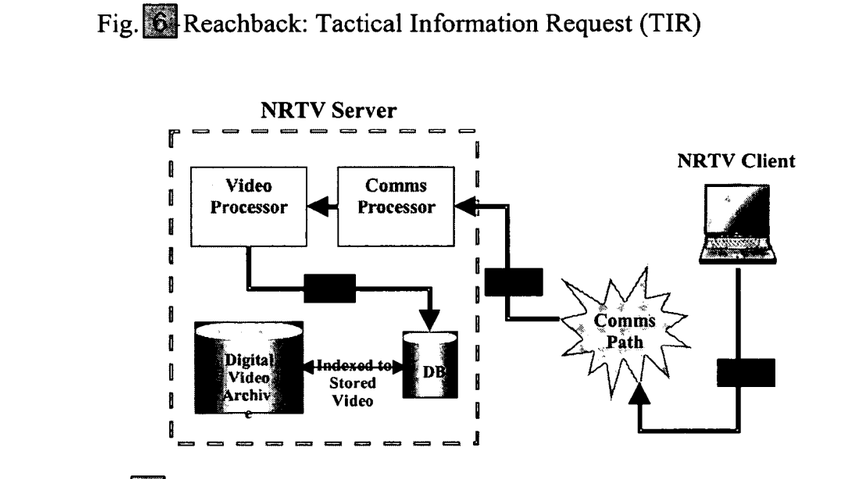
Figure 7:
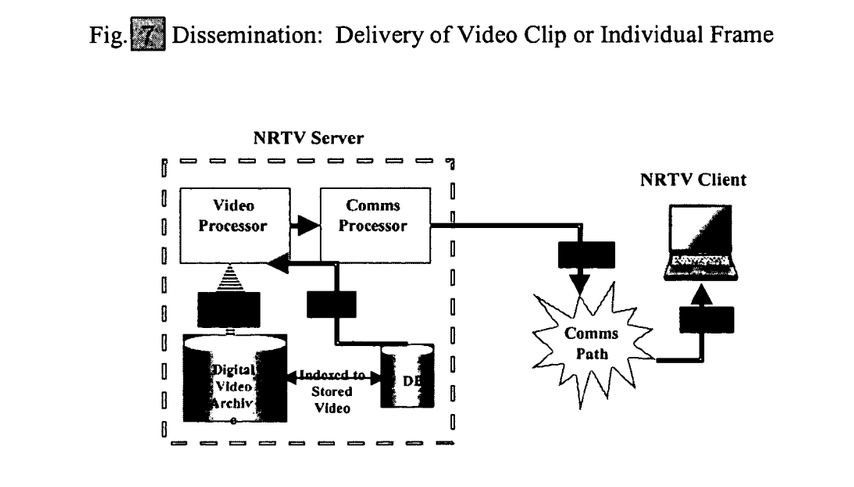

It may be helpful now to consider the main steps of operations of the NRTV video dissemination system. FIGS. 5 to 7 are useful in understanding these operations.

As shown in FIG. 5, a surveillance video source, from a manned platform or unmanned aerial vehicle (UAV), is received via a network or RF communications link as an NTSC OR PAL analog signal or as a digital stream. The data will be decrypted by the receiving system, if it is encrypted. The streaming analog video will be fed into the video processor sub-component of the NRTV server.

If not already digital, the incoming video is digitally encoded, time stamped (indexed) and converted into an MPEG-2 formatted video file via the video capture subsystem that is part of the video processor, and stored on local hard drives for later access. The local hard drives can nominally store an entire mission, which could last up to 8 hours or more. Increased storage capacity can be added.

In parallel, the telemetry metadata from the surveillance sensor is parsed, validated, time stamped (indexed) and stored in a local hard drive. This processing of the telemetry data generates an ASCII file that contains sufficient parametric information (geographic location and technical sensor pointing information) necessary for the client display subsystem to graphically represent the sensor field of view data as overlays on a digital map. In the example, the overlays appear as four-sided polygons, typically rectangles. The ASCII data file is passed to the communications processor, for relaying to the client subsystem(s) over available communications (Network or RF communications system) (file transfer).

In parallel with the ASCII file generation, video frames are sampled, time stamped (indexed) and stored locally by the VP server subsystem at the same rate that the field of view data is generated. The client device receives the formatted metadata from the communications processor. The client device parses the data into separate records, since the communications processor may send partial or multiple records in one transmission. The client device copies the data contained in each complete record into an internal structure. The client device stores each complete data record into an internal SQL database. This allows archival retrieval and playback of the data.

Using the location and field-of-view sensor data, the geographic coordinates of the area on the earth that was seen by the image sensor for the specific instance of metadata can be calculated. The client device calculates these coordinates and creates a rectangular graphical object ('overlay'). The client device generates screen coordinates for each geographic coordinate and draws the overlay for each record. Associated with each overlay is the data received for each metadata record. This data is available to the user by use of the GUI associated with each overlay on the screen.

With reference to FIG. 6, each overlay on the users' screen is associated, by time, with a single frame from the video stream. Using the client GUI, the user can select 1 or more overlays to request a series of video stills from the VP. The overlays selected need not be contiguous. The client will build a Tactical Information Request (TIR) with the time values associated with each selected overlay to be sent to the VP via the communications processor.

At the server, the communications processor will pass each time value to the video processor. When the still is received from the video processor, the communications processor will send it to the client. The client will receive the still and update the associated overlay to indicate graphically to the user that the still has been received. The user can select the still for display by itself or have the still overlaid on the current map.

Using the client GUI, the user can select 2 overlays (a start of video and an end of video frame) to request a video clip for extraction from the video stream by the video processor. The client will build a TIR with the time values associated with the 2 selected overlays to be sent to the video processor via the communications processor. The format for the video clip will be MPEG2, which is currently in general use. Future formats could include MPEG4, or other accepted video encoding standards.

The communications processor validates the request from the client, for example, by authenticating the user and/or client device and confirming that the requested information is available (and/or is available to this user). The communications processor will build a request for the video processor containing the start time and stop time of the requested clip. When the clip is received from the VP, the communications processor will send it to the client, as shown in FIG. 7. When the clip is received by the client device, the default video player software will play the clip automatically on the display of the user interface.

Those skilled in the art will recognize that the concepts outlined above may be implemented in software programming, for example, as executed on the server 3 and the client devices 5. As such, the concepts herein encompass the programmed components as well as products bearing the relevant software. In alternative examples, hard-wired circuitry may be used in place of or in combination with software instructions to implement the NRTV functionalities. Thus, examples of the invention are not limited to any specific combination of hardware circuitry and software.

A software product includes information that may be carried by at least one machine-readable medium. The information carried by the medium may be executable code, one or more databases, information regarding surveillance video available through the NRTV dissemination technology and/or actual video.

Terms such as computer or machine "readable storage medium" as used herein refer to any storage type medium that participates in providing instructions to a processor for execution. Such a medium may take many forms, including but not limited to, non-volatile storage media and volatile storage media. Non-volatile storage media include, for example, optical or magnetic disks, such as storage devices 155 and 255. Volatile storage media include dynamic memory, such as main memory 153 and 253. Transmission media include coaxial cables; copper wire and fiber optics, including the wires that comprise bus 154 or bus 254. Common forms of computer-readable storage media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, and any other memory chip or cartridge or any other medium from which a computer or the like can read stored information. Various forms of computer readable storage media may be involved in carrying one or more sequences of one or more instructions to a system 151 or 251 or within the system to a processor 152 or 252 for loading into the computer system and/or for execution by the respective processor.

While the foregoing has described what are considered to be the best mode(s) and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of obtaining and presenting video surveillance information, comprising:
   over a period of time, receiving position and orientation telemetry regarding operation of a camera mounted on an airborne moveable surveillance platform;
   processing the telemetry over the period of time to determine a plurality of earth-oriented fields of view of the camera during movement of the airborne surveillance platform over the period of time;
   displaying over time, representations of the determined earth-oriented fields of view of the camera on a map display on a user interface;
   detecting a user selection of a displayed representation of at least one field of view via the user interface, the selected representation corresponding to a portion of the period of time;
   formulating an information request indicating the corresponding portion of the period of time;
   sending the information request via a network to a facility having access to stored video information received from the camera, over the period of time;
   receiving one or more frames of video information generated by the camera, from the facility via the network, the one or more frames containing actual image data taken by the camera during the corresponding portion of the period of time and corresponding to the user selected representation of one or more fields of view; and
   displaying the received one or more frames of video information to the user.

2. The method as in claim 1, wherein the step of displaying the representations of the determined earth-oriented fields of view of the camera on the map display on the user interface comprises:
   displaying a map of a geographic region under surveillance by the moveable surveillance platform; and
   overlaying outlines of the determined earth-oriented fields of view of the camera, for a plurality of points in time, on the displayed map.

3. The method as in claim 2, wherein the step of detecting the user selection comprises receiving a user selection of at least one displayed outline of a determined view of the camera.

4. The method as in claim 3, wherein the step of detecting the user selection further comprises receiving a user selection of a time interval referenced to the point in time corresponding to the selected displayed outline of a determined view of the camera.

5. The method as in claim 3, wherein the step of receiving a user selection of at least one displayed outline comprises receiving user selection of a plurality of the displayed outlines of determined views of the camera.

6. The method as in claim 5, wherein the one or more frames of video information consist essentially of a plurality of selected still frame images.

7. The method as in claim 4, wherein the received and displayed video information comprises a video clip of a user selected duration.

8. The method as in claim 3, further comprising overlaying an indicator of the current location of the moveable surveillance platform on the displayed map, concurrent with the overlaying of the outlines of the determined views of the camera for the plurality of points in time.

9. A method of disseminating video surveillance information, comprising:
   over a period of time, receiving and storing real-time video image information from a camera mounted on an airborne moveable surveillance platform;
   with the video image information, receiving position and orientation telemetry regarding operation of the camera over the period of time;
   transmitting notification messages to a user's client device over limited network communication facilities, the notification messages including information regarding the telemetry sufficient to allow determination of earth-oriented fields of view of the camera during movement of the airborne surveillance platform during the period of time;
   receiving an information request from the user's client device, the information request identifying a user selected portion of the received real-time video image information; and
   transmitting the selected portion of the video image information to the user's client device over the limited network communications facilities.

10. The method as in claim 9, wherein the step of receiving and storing video image information comprises:
    receiving an analog video signal from the camera;
    digitizing the received analog video signal;
    indexing the digitized video signal; and
    storing the digitized and indexed video signal.

11. The method as in claim 9, wherein:
    the notification messages are transmitted periodically, and
    each notification message contains information relating to at least one of the earth-oriented fields of view of the camera.

12. The method as in claim 9, wherein:
    the received information request identifies a point in the received video image information and a time interval in relation to the identified point; and
    the step of transmitting video image information comprises extracting a clip of video information of the identified time interval in relation to the identified point, from the stored video image information, and transmitting the clip of video information to the user's client device.

13. The method as in claim 9, wherein:
    the received information request identifies a plurality of user selected points in the received video image information; and
    the transmitted video image information comprises video frames corresponding to the user selected points.

14. A terminal device comprising:
    a processor,
    a user interface,
    a communication interface, a program storage device, and a program in said storage device for execution by the processor, wherein execution of the program by the processor causes the terminal to implement functions, comprising:

over a period of time, receiving position and orientation telemetry regarding operation of a camera mounted on an airborne moveable surveillance platform, through limited communication facilities;

processing the telemetry to determine earth-oriented fields of view of the camera over the period of time;

displaying over time, representations of the determined fields of view of the camera on a map display on the user interface;

detecting a user selection of a displayed representation of at least one field of view via the user interface, the selected representation corresponding to a portion of the period of time;

formulating an information request indicating the corresponding portion of the period of time;

sending the information request through the limited communication facilities to a facility having access to stored video information received from the camera, over the period of time;

receiving one or more frames of video information generated by the camera, from the facility through the limited communication facilities, the one or more frames containing actual image data taken by the camera during the corresponding portion of the period of time and corresponding to the user selected representation of at least one field of view; and displaying the received one or more frames of video information to the user.

15. A computer comprising:

a programmable processor, data storage, a program storage device, a program in the program storage device, and a communication interface, wherein execution of the program by the processor causes the computer to implement functions for disseminating video surveillance information, the functions comprising:

over a period of time, receiving and storing real-time video image information from a camera mounted on an airborne moveable surveillance platform, in the data storage;

with the video image information, continuously receiving position and orientation telemetry regarding operation of the camera over the period of time;

transmitting notification messages to a user's client device, through limited network communication facilities via the communication interface, the notification messages including information regarding the telemetry sufficient to allow determination of earth-oriented fields of view of the camera during movement of the airborne surveillance platform during the period of time;

receiving an information request from the user's client device via the communication interface, the information request identifying a user selected portion of the received real-time video image information; and transmitting the selected portion of the video image information to the user's client device through the limited network communication facilities, via the communication interface.

16. The computer as in claim 15, further comprising:

a video processor, for receiving an analog video signal from the camera, digitizing the received analog video signal and indexing the digitized video signal;

wherein the server stores the digitized and indexed video signal in the data storage.

17. The computer as in claim 15, wherein the program causes the processor to authenticate the user in response to the request.

18. A product comprising:

a computer readable storage medium, and a program embodied in the storage medium, the program being executable by a processor of a terminal device to cause the terminal device to implement functions, comprising:

over a period of time, receiving position and orientation telemetry regarding operation of a camera mounted on an airborne moveable surveillance platform, through limited communication facilities;

processing the telemetry to determine earth-oriented fields of view of the camera over the period of time;

displaying over time, representations of the determined fields of view of the camera on a map display on a user interface;

detecting a user selection of a displayed representation of at least one field of view via the user interface, the selected representation corresponding to a portion of the period of time;

formulating an information request indicating the corresponding portion of the period of time;

sending the information request through the limited communication facilities to a facility having access to stored video information received from the camera, over the period of time;

receiving one or more frames of video information generated by the camera, from the facility through the limited communication facilities, the one or more frames containing actual image data taken by the camera during the corresponding portion of the period of time and corresponding to the user selected representation of at least one field of view; and displaying the received one or more frames of video information to the user.

19. The product as in claim 18, wherein the function of displaying the representations of the determined earth-oriented fields of view of the camera on the user interface comprises:

displaying a map of a geographic region under surveillance by the moveable surveillance platform; and overlaying outlines of the determined earth-oriented fields of view of the camera, for a plurality of points in time, on the displayed map.

20. The product as in claim 19, wherein the function of detecting the user selection of the view via the user interface comprises receiving a user selection of at least one displayed outline of a determined view of the camera.

21. The product of claim 19, wherein the function of detecting the user selection of the view via the interface further comprises receiving a user selection of a time interval referenced to the point in time corresponding to the selected displayed outline of a determined view of the camera.

22. The product of claim 19, wherein the function of receiving a user selection of at least one displayed outline comprises receiving user selection of a plurality of the displayed outlines of determined views of the camera.

23. The product of claim 22, wherein the one or more frames of video information consist essentially of a plurality of selected still frame images corresponding to the user selected outlines.

24. The product of claim 22, wherein the one or more frames of video information comprise a video clip of a user selected duration, and the start and end of the video clip correspond to two of the user selected outlines.

25. The product of claim 20, the functions further comprise overlaying an indicator of the current location of the moveable surveillance platform on the displayed map, concurrent with the overlaying of the outlines of the determined view of the camera for the plurality of points in time.

26. A product comprising:
a computer readable storage medium, and
a program embodied in the computer readable storage medium,
the program being executable by a processor of a computer so as to cause the computer to implement functions for disseminating video surveillance information, the functions comprising:
over a period of time, receiving and storing real-time video image information from a camera mounted on an airborne moveable surveillance platform;
with the video image information, receiving position and orientation telemetry regarding operation of the camera over the period of time;
transmitting notification messages to a user's client device through limited network communication facilities, the notification messages including information regarding the telemetry sufficient to allow determination of earth-oriented fields of view of the camera during movement of the airborne surveillance platform during the period of time;
receiving an information request from the user's client device, the information request identifying a user selected portion of the received real-time video image information received over the period of time; and
transmitting the selected portion of the video image information to the user's client device through the limited network communication facilities.

27. The product as in claim 26, wherein the function of receiving and storing video image information comprises:
receiving an analog video signal from the camera;
digitizing the received analog video signal;
indexing the digitized video signal; and
storing the digitized and indexed video signal.

28. The product as in claim 26, wherein:
the notification messages are transmitted periodically, and
each notification message contains information relating to at least one of the earth-oriented fields of view of the camera at a point in time.

29. The product as in claim 26, wherein:
the received information request identifies a point in the received video image information and a time interval in relation to the identified point; and
the function of transmitting video image information comprises extracting a clip of video information of the identified time interval in relation to the identified point, from the stored video image information, and transmitting the clip of video information to the user's client device.

30. The product as in claim 26, wherein:
the received information request identifies a plurality of user selected points in the received video image information; and
the transmitted video image information comprises video frames corresponding to the user selected points.

31. The product as in claim 26 wherein:
the received information request identifies a user selected frame in the received video image information; and
the transmitted video information comprises the user selected frame.

32. The product of claim 31, wherein the transmitted information consists of the user selected frame.

* * * * *